(12) United States Patent
Begin et al.

(10) Patent No.: US 8,157,084 B2
(45) Date of Patent: Apr. 17, 2012

(54) METHOD AND DEVICE FOR ORIENTATING PRODUCTS ON A CONVEYOR

(75) Inventors: Michel Begin, Octeville-sur-Mer (FR);
Sebastien Guelaud, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 106 days.

(21) Appl. No.: 12/324,349

(22) Filed: Nov. 26, 2008

(65) Prior Publication Data
US 2009/0139840 A1    Jun. 4, 2009

(30) Foreign Application Priority Data
Nov. 29, 2007 (FR) ...................... 07 08326

(51) Int. Cl.
*B65G 47/244* (2006.01)
*B65G 47/00* (2006.01)
(52) U.S. Cl. ........ 198/617; 198/415; 198/379; 198/400; 198/399; 198/376
(58) Field of Classification Search ........................ None
See application file for complete search history.

(56) References Cited

U.S. PATENT DOCUMENTS

| | | | | |
|---|---|---|---|---|
| 2,156,020 | A * | 4/1939 | Lathrop | 198/836.3 |
| 3,336,723 | A * | 8/1967 | Shazor, Jr. | 53/48.1 |
| 3,462,001 | A | 8/1969 | Boyce | |
| 4,465,175 | A * | 8/1984 | Caldwell | 198/399 |
| 5,388,707 | A * | 2/1995 | Stivison et al. | 209/602 |
| 6,513,643 | B2 * | 2/2003 | Nakada | 198/379 |
| 7,014,032 | B2 * | 3/2006 | Franzaroli | 198/399 |

FOREIGN PATENT DOCUMENTS

| | | |
|---|---|---|
| BE | 1 013 751 A3 | 7/2002 |
| EP | 0576076 A1 | 12/1993 |
| JP | 2005306458 | 11/2005 |
| WO | 2007/135498 A2 | 11/2007 |

OTHER PUBLICATIONS

Preliminary Search Report for FR 0708326 completed Jun. 30, 2008.
Canadian Office Action for corresponding Application No. 2,645,620 dated Jan. 7, 2011 together with English translation.
Japanese Office Action for corresponding Application No. 2008-305217 dated Jan. 10, 2012, together with English translation.

* cited by examiner

*Primary Examiner* — Kavel Singh
(74) *Attorney, Agent, or Firm* — Sughrue Mion, PLLC

(57) ABSTRACT

The method relates to products such as bottles whose horizontal cross section of contact is oval and which are conveyed in the longitudinal direction, in single file and spaced apart, on a conveyor. The method includes introducing the bottles one by one into a neck, at the downstream end of which motorized rollers are disposed, applying the rollers to the opposite faces of each bottle to be orientated, providing the passive roller with a peripheral speed equal to the speed of conveyance of the bottles and providing the active roller with a higher peripheral speed to position the bottle diagonally on the conveyor.

10 Claims, 1 Drawing Sheet

METHOD AND DEVICE FOR ORIENTATING PRODUCTS ON A CONVEYOR

FIELD OF THE INVENTION

This invention relates to a method for orientating products of non-circular shape, such as of oval shape, moving in single file, carried by a conveyor. It also relates to the device for carrying out said method.

DESCRIPTION OF PRIOR ART

As they leave a filling or labelling machine, these products, such as bottles, are aligned in their longitudinal direction on the conveyor, but when they arrive in a clustering or accumulating or other location they do not always position themselves in a regular orderly fashion, such as diagonally.

They may be pushed against each other with opposite orientations, in which case their spacing is irregular.

When they are received for the boxing operation, for example, incidents may occur and interrupt the production line.

It is prior art to modify the orientation of products, as described in document WO 2007/135498, for example, but, depending on the type of product, the means to be applied can vary considerably.

SUMMARY OF THE INVENTION

The present invention provides a method and means for automatically manipulating all of these bottles before they reach their clustering and/or accumulating location, where they are positioned diagonally.

This manipulation performs an identical pre-orientation of all of the bottles, without the risk of errors, and as a result enables production lines to run quickly and efficiently, without collisions or incidents.

According to the invention, the bottle manipulating method consists in:
- feeding said bottles in single file, spaced apart along the conveyor of the device,
- introducing the products into a neck, like a narrower section, at the downstream end of which are rotary members, in the form of motorized rollers, which rollers are positioned on either side of the passage of said bottles and rotated about a vertical axis,
- applying said rollers to the opposite faces of each bottle to be manipulated,
- giving one of the rollers a certain peripheral speed, said roller acting as a passive roller, and
- giving the other roller, which acts as an active roller, a peripheral speed higher than that of said passive roller in order to produce a sort of "rolling" and pivoting of the bottle around said passive roller to pre-orientate it diagonally on the conveyor, before the clustering station.

In a preferred arrangement of the invention, the peripheral speed of the passive roller is equal to the speed of conveyance of the bottles on the conveyor, so as not to trouble or interfere with the rate of throughput.

Again according to the invention, the method consists in offsetting the bottles sideways before introducing them into the neck, towards the active roller, which preparatory offset allows the position of said bottles to be adjusted as they pass out from between the rollers, in view of the fact that their axis moves towards the active roller as they pivot and move around the passive roller.

The invention also relates to the means for carrying out the invention and in particular a device that comprises, arranged above the conveyor, a neck consisting of two arms spaced apart and movable relative to each other, between which the bottles to be manipulated pass, which arms are each carried by a box that is itself guided transversely on a structure and each arm comprises a rotary member in the form of a motorized roller or rollers, which roller is coaxial with a vertical spindle parallel to the axis of said bottles and these rollers are positioned opposite each other so that each is in contact with a lateral face of said bottles, said rollers being given a different speed from each other.

Another provision of the invention is that each roller is driven by a motor member, with means for varying their speed of rotation as a function, in particular, of the speed of conveyance of the bottles on the conveyor, the shape of said bottles and the angle of orientation which it is wished to give them at the exit from the neck.

Again according to the invention, the device comprises means for adjusting the initial position of the arms relative to the conveyor and in particular the distance between them, to adapt it to the thickness of the bottles, which distance is substantially less than said thickness of the bottles.

In accordance with another provision of the invention, the device comprises means for adjusting the position of the rollers, in height, relative to the level of the conveyor on which the bottles are standing and relative to the size of the latter.

According to the invention, again, the device comprises one arm that is stationary throughout the bottle manipulating operation and the other arm, the arm carrying the active roller, is movable but permanently subjected to an elastic return system which applies said active roller to the bottles.

In another provision of the invention, the device comprises means for offsetting the bottles sideways, on the conveyor, upstream of the neck, said offset being towards the active roller to allow said bottles to be re-centred after they have passed through said neck.

BRIEF DESCRIPTION OF THE DRAWINGS

However, the invention will be further detailed with the aid of the following description and the accompanying drawings, which are given by way of indication, in which.

DETAILED DESCRIPTION OF THE INVENTION

Figure 1:
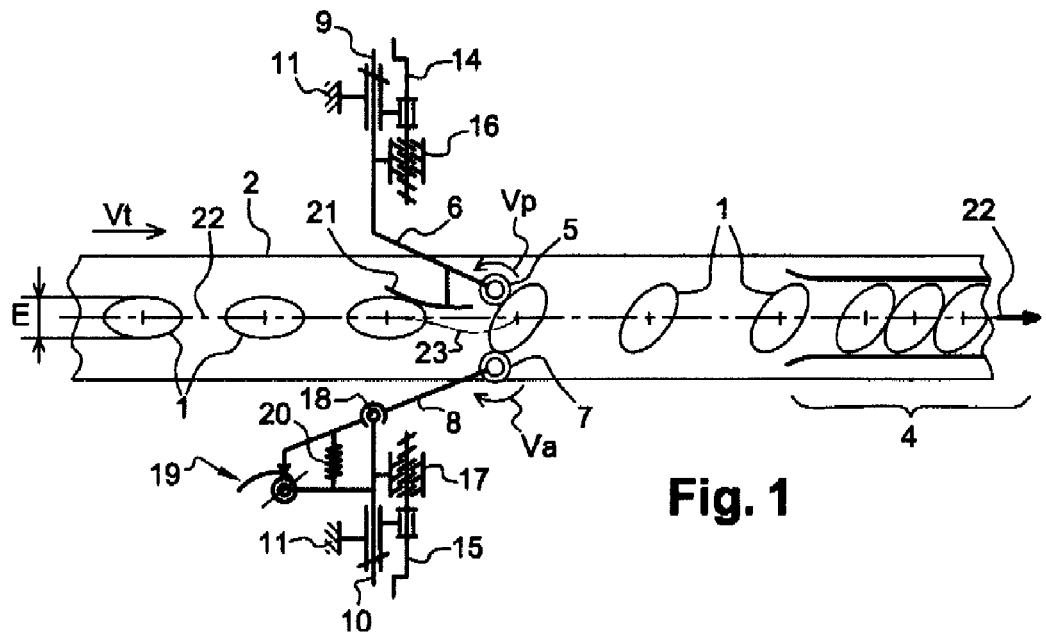
FIG. 1 is a schematic plan view of the device for carrying out the method according to the invention.
Figure 2:
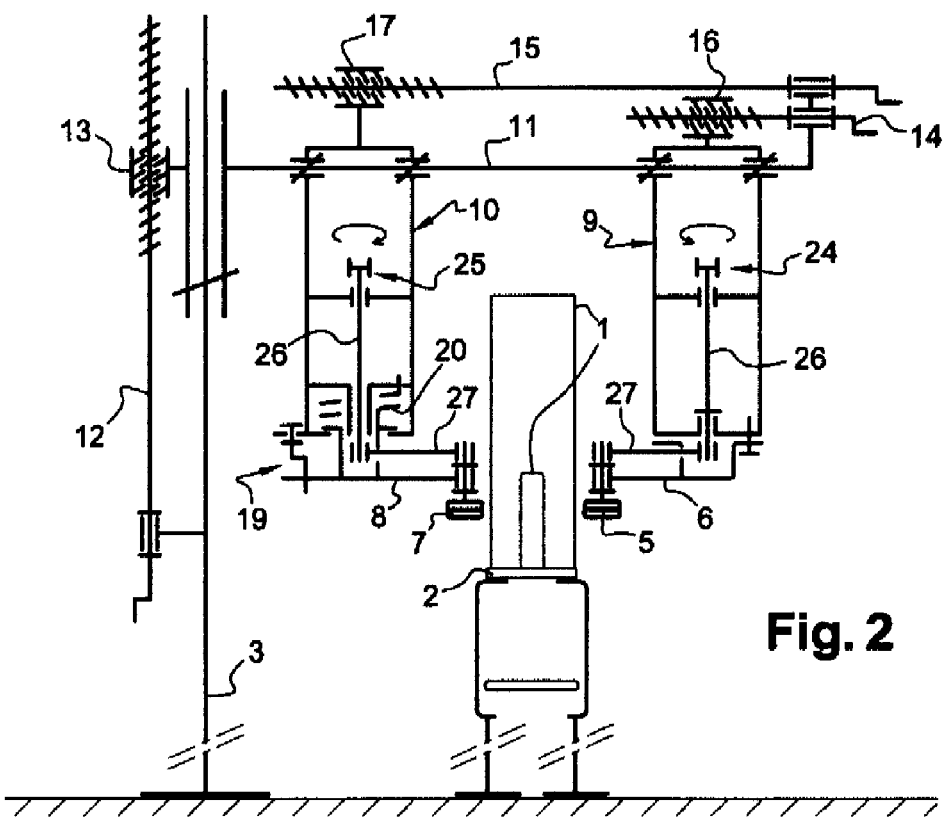
FIG. 2 is a schematic side view of the device, which device is connected, as an accessory, to a conveyor conveying individual products such as bottles.

The particular products in question are actually bottles (1) which appear in FIGS. 1 and 2. These bottles (1) are of an oval or polygonal shape which may require an orientation, rectangular, for example, with rounded corners.

The cross section of the surface of the bottles where they contact each other is such as to make them unstable in the plane of their orientation as soon as they touch each other. Examples of this would be bottles whose cross section is oval or equivalent, with capacities of from 100 ml to 5 liters, for example, as can be seen in FIG. 2 on the conveyor belt (2).

The device according to the invention performs a novel pre-orientating manipulation of these bottles (1): it may for example be installed between a bottle (1) filling or labelling preparing machine and a bottle clustering and/or packaging machine. This device comprises a frame (3) and is installed around the conveyor (2) which carries the bottles (1) between the two abovementioned machines.

The bottles (1) are stood lengthwise on the conveyor (2), which moves them at an appropriate speed Vt; they are spaced out on this conveyor (2) and, after their manipulation by the device according to the invention, they progress towards the accumulating station (4) of the clustering and/or packaging machine, for example.

The manipulation administered by the device according to the invention consists in pivoting the bottles (1) upon the conveyor (2) without stopping them; this manipulation is performed in motion by passing the bottles (1) through a sort of narrower section, or neck, where they are given a new, diagonal orientation that is easier to handle and gives them error-free positioning in the accumulating station (4).

This neck consists of two rotary members in the form of rollers arranged one on either side of the passage of the bottles (1): one roller (5) mounted on an arm (6), and one roller (7) mounted on an arm (8).

These rollers (5) and (7) are mounted on vertical spindles perpendicular to the conveyor (2) and are driven individually in order to act on the sides of the bottles (1) as they pass. These two rollers (5) and (7) enclose the passing bottle (1) with a predetermined pressure by means of members which will be detailed later in the description.

The roller (5), which may be described as the passive roller, accompanies the bottles (1) as they pass; its circumferential speed Vp is preferably the same as the speed Vt of conveyance of said bottles by the conveyor (2), so as not to disturb their conveyance and the rates of throughput.

The roller (7), which can be described as the active roller, tends to accelerate the bottles (1) as they pass it by giving them a small push. Its circumferential speed Va is variable to suit the shape of the bottles and the angle of orientation which it is desired to give them by the time they leave the neck.

As it passes between the two rollers (5) and (7), the bottle (1) is subjected to a couple; it clings to the roller (5), which is passive, while the active roller (7) "rolls" it and causes it to pivot around said roller (5) because of the speed differential between the two rollers.

When this manipulation of the bottle (1) by the two rollers (5) and (7) is over, said bottle has adopted an angularly oriented position on the conveyor (2), which position is more suitable for a diagonal in-line accumulation, in single file.

The efficiency and accuracy of this manipulation requires great accuracy in the position of the two rollers (5) and (7) and in the way in which their speed of rotation is adjusted.

In broad terms, the rollers (5) and (7) are located at the downstream end of the V-neck, carried by the arms (6) and (8), respectively, as indicated earlier; which arms (6) and (8) form said neck which the bottles (1) enter. These two arms (6) and (8) are themselves carried by box structures (9) and (10), respectively; which boxes (9) and (10) are installed on a structure (11) mounted transversely over the conveyor (2), the structure (11) itself being guided on the frame (3) of the device.

In more detail, the structure (11) is guided vertically on the frame (3) and can be moved by suitable means such as a screw and nut. In the diagram, FIG. 2, the screw (12) is connected to the frame (3) and the nut (13) to the structure (11). This vertical movement of the structure (11) allows the height of the two rollers (5) and (7) to be adjusted relative to the level of the conveyor (2) and relative to the bottles (1), according to their size, in particular.

The boxes (9) and (10) are guided horizontally on the structure (11) and can both be moved transversely by appropriate screw and nut type means. In the diagram the two screws (14) and (15) are connected to the structure (11) and the nuts (16) and (17) are connected to said boxes (9) and (10), respectively. This transverse movement of the boxes (9) and (10) allows the position of the two rollers (5) and (7) to be adjusted relative to the conveyor (2) and to the bottles (1) standing on the latter, by allowing the distance between said rollers and the exit axis of the products on the conveyor (2) to be adjusted.

This distance between the two rollers (5) and (7) is a function of the thickness of the bottles (1) and also depends on the size and shape of the bottles. The distance between the rollers (5) and (7) is less than the transverse thickness E of the bottles (1) and is variable not only as a function of the thickness, shape and sturdiness of said bottles but also as a function of the angle of orientation desired for the exit side of the neck.

This distance can be adjusted by means of a complementary adjustment which can be applied to the arm (8) carrying the active roller (7). This arm (8) is pivoted underneath the box (10) about a vertical axis (18) and its angular position is determined by a stop (19) mounted to the box (10). This angular position is adjustable by means of the stop (19), which takes the form of an eccentric and is held in position by an elastic return member (20). The elastic member (20) is a spring which, as shown in FIG. 2, is of the helical torsion type, interposed between the arm (8) and the box (10).

When a bottle (1) passes between the two rollers (5) and (7), the active roller (7) retreats in step with the rotation of said bottle and returns automatically to its position after the pre-orientation manipulation.

The position of the roller (5) that is passive can be fixed to serve as a reference for the positioning of the bottle (1) on the conveyor (2). This roller (5) is carried by the arm (6) which is connected to the box (9).

It will be seen, FIG. 1, that the arm (6) comprises, upstream of the roller (5), a means (21) in the form of a guide, for slightly shifting the bottles (1) sideways before they enter the neck and meet the two rollers (5) and (7).

The path of the bottles (1) is slightly offset from the central longitudinal axis (22) of the conveyor (2), towards the active roller (7). The offset of this path, which is marked (23) in FIG. 1, has as close a value as possible to that of the displacement of the bottle axis when it pivots around the passive roller (5). The shift allows the position of the bottles (1) to be adjusted as they pass out from between the rollers (5) and (7) and in particular allows them to be positioned on the central longitudinal line of the conveyor.

The rollers (5) and (7) are driven by respective motors (24) and (25) as shown schematically in FIG. 2. These motors are connected to appropriate control means to vary and adapt their speed of rotation to suit, in particular, the shape of the products and their speed of travel with the conveyor (2).

These motors (24) and (25) are housed in the boxes (9) and (10).

The connection between the motors (24) and (25) and the rollers (5) and (7), respectively, is by means of shafts (26) extending vertically down the boxes (9) and (10), and belts (27) running between said shafts and said rollers.

For safety reasons, the arms (6) and (8) are tubular and the belts (27) are housed inside said arms.

With a view to simplifying the construction of this type of device, the two arms (6) and (8) can be made symmetrically, as can the boxes (9) and (10). The difference between these two arm/roller sets will affect the choice of the passive roller (5), that is, the roller which will act as the reference for the positioning of the bottles (1) on the conveyor (2).

What is claimed is:

1. A device for carrying out a method for manipulating products including bottles whose horizontal cross section of contact is of oval type and which are conveyed on a conveyor at a speed Vt, in a longitudinal direction of the bottles, the device comprising:
   a neck disposed above a conveyor and comprising two arms which are spaced apart and movable relative to each other, wherein:
   said bottles pass between the arms,
   each of the arms is carried by a box, respectively,
   the boxes are guided transversely on a structure,
   each arm comprises a rotary member comprising a motorized roller,
   the rollers are coaxial with a vertical spindle parallel to an axis of said bottles and are positioned opposite each other so that each roller is in contact with an opposite lateral face of each of said bottles,
   one of said rollers accompanies the bottles and is given a peripheral speed Vp equal to the speed Vt of a conveyance of the bottles on the conveyor, and
   another one of said rollers is given a peripheral speed Va different from the peripheral speed Vp to produce rolling and pivoting of the bottle around the one roller to position the longitudinal direction of the bottle diagonally on the conveyor with an angle with respect to a flow direction of the conveyor.

2. The device according to claim 1, wherein each roller is driven by a motor member with respective means for varying a speed of rotation of each motor member as a function of at least one of the speed Vt of the conveyance, a shape of the bottles, and a desired angle of orientation at an exit of the neck.

3. The device according to claim 1, further comprising:
   means for adjusting an initial position of the arms with respect to a distance between the arms, to adapt the distance between the arms to a thickness of the bottles, which distance is substantially less than said thickness of said bottles.

4. The device according to claim 1, further comprising:
   means for adjusting a position of the rollers in height, relative to the conveyor and as a function of a size of the bottles.

5. The device according to claim 1, wherein one of the arms is stationary throughout a bottle manipulating operation and other arm is movable and subjected to an elastic return system.

6. The device according to claim 1, further comprising:
   means for offsetting the bottles sideways upstream of the rollers, towards the active roller to allow said bottles to be re-centered after the bottles pass through the neck, on the conveyor.

7. The device according to claim 1, wherein the angle is a desired angle of an orientation, in order to prepare the bottles for packing.

8. The device according to claim 1, the device is configured to:
   introduce the bottles one by one into the neck;
   apply the rollers to the opposite lateral faces of each bottle to be orientated;
   give the one roller the peripheral speed Vp, the one roller accompanying the bottles and acting as a passive roller with the peripheral speed Vp equal to the speed Vt of a conveyance of the bottles on the conveyor; and
   give the other roller, which acts as an active roller, the peripheral speed Va higher than that of the passive roller to produce rolling and pivoting of the bottle around the passive roller to position the longitudinal direction of the bottle diagonally on the conveyor with the angle with respect to the flow direction of the conveyor.

9. The device according to claim 8, the device is further configured to offset the bottles sideways on the conveyor, before introducing the bottles into the neck, towards the active roller, which offsetting allows a position of the bottles to be adjusted as the bottles pass out from between the rollers.

10. The device according to claim 1, wherein the peripheral speed Va is higher than the peripheral speed Vp.

* * * * *